(12) United States Patent
Huang

(10) Patent No.: US 8,303,292 B2
(45) Date of Patent: Nov. 6, 2012

(54) INJECTION MOLD

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 511 days.

(21) Appl. No.: 12/649,531

(22) Filed: Dec. 30, 2009

(65) Prior Publication Data

US 2010/0310709 A1  Dec. 9, 2010

(30) Foreign Application Priority Data

Jun. 4, 2009  (CN) .......................... 2009 1 0302915

(51) Int. Cl.
*B29C 45/40* (2006.01)

(52) U.S. Cl. .................. 425/192 R; 425/468; 425/556; 425/577

(58) Field of Classification Search .................. 425/190, 425/192 R, 440, 444, 468, 556, 577, DIG. 58, 425/438, 441, 443
See application file for complete search history.

(56) References Cited

U.S. PATENT DOCUMENTS

| | | | | |
|---|---|---|---|---|
| 2,834,989 A * | 5/1958 | Kusnery | ........................... | 249/68 |
| 3,844,703 A * | 10/1974 | Hutter | ........................... | 425/556 |
| 3,871,611 A * | 3/1975 | Taketa | ........................... | 249/102 |
| 3,900,183 A * | 8/1975 | Wallace | ........................... | 249/68 |
| 3,963,209 A * | 6/1976 | Muller | ........................... | 249/67 |
| 4,280,549 A * | 7/1981 | Gibbs | ........................... | 164/113 |
| 4,379,684 A * | 4/1983 | Katagiri et al. | ................. | 425/78 |
| 4,456,445 A * | 6/1984 | DeSantis et al. | ................. | 425/78 |
| 4,545,753 A * | 10/1985 | Hehl | ........................... | 425/350 |
| 4,645,446 A * | 2/1987 | Hehl | ........................... | 425/350 |
| 4,684,101 A * | 8/1987 | Wagner et al. | ................. | 249/144 |
| 4,793,785 A * | 12/1988 | Osada | ........................... | 425/116 |
| 4,929,170 A * | 5/1990 | Boskovic | ....................... | 425/556 |
| 5,059,105 A * | 10/1991 | Baird | ........................... | 425/116 |
| 5,316,467 A * | 5/1994 | Starkey | ........................ | 425/438 |
| 5,511,967 A * | 4/1996 | Berdan | ......................... | 425/533 |
| 5,718,930 A * | 2/1998 | Stengel | ........................ | 425/556 |
| 6,872,069 B2 * | 3/2005 | Starkey | ........................ | 425/556 |
| 7,140,868 B1 * | 11/2006 | Steele et al. | .................. | 425/438 |
| 7,153,126 B2 * | 12/2006 | Takao | ........................... | 425/444 |
| 7,214,046 B2 * | 5/2007 | Gakovic | ......................... | 425/78 |
| 7,267,538 B2 * | 9/2007 | Morales-Centeno | ......... | 425/190 |
| 7,913,369 B2 * | 3/2011 | Gakovic | ..................... | 29/402.08 |
| 2004/0182806 A1 * | 9/2004 | Figueroa | ..................... | 211/105.4 |
| 2004/0241278 A1 * | 12/2004 | Morales-Centeno | ......... | 425/556 |
| 2005/0266111 A1 * | 12/2005 | Ciccone et al. | ........... | 425/192 R |
| 2006/0237875 A1 * | 10/2006 | Drees | ......................... | 264/328.1 |

* cited by examiner

*Primary Examiner* — Yogendra Gupta
*Assistant Examiner* — Emmanuel S Luk
(74) *Attorney, Agent, or Firm* — Altis Law Group, Inc.

(57) ABSTRACT

An injection mold is disclosed. The injection mold includes a female die, a male die and an ejection device die slidably passing through the male die for ejecting molded product out of the mold. The female die includes a female die body and a female die core received therein. The male die includes a male die body and a male die core slidably received therein. The female die core and the male die core configured for cooperatively defining a molding cavity for forming a product. The ejection device includes a first ejection rod and a second ejection rod slidably connected to the first ejection rod. A first distal end of the first ejection rod is connected to the male die core. When molding product, an end of the second ejection rod distal from the first ejection rod is configured to be fixed relative to the male die.

16 Claims, 3 Drawing Sheets

INJECTION MOLD

BACKGROUND

1. Technical Field

The present disclosure relates to molds, particularly, relates to an injection mold.

2. Description of Related Art

An injection mold typically includes an ejection device. One end of the ejection device is connected to the die core of the injection mold for taking a molded product out of the injection mold. When the product is being molded, the ejection device is driven to eject the die core of the injection mold together with the molded product out of the injection mold. Then the molded product can be separated from the die core. After the molded product is taken out of the injection mold, another end of the ejection device far away from the die core is driven to and fixed at an original position, and then the die core is driven to an original position.

However, because the ejection device is rigid, during molding the product, the die core of the injection mold may be tilted under the injection pressure and the ejection device.

What is needed, therefore, is an injection mold to overcome the above-mentioned problems.

BRIEF DESCRIPTION OF THE DRAWINGS

The components of the drawings are not necessarily drawn to scale, the emphasis instead being placed upon clearly illustrating the principles of the embodiments of the injection mold. Moreover, in the drawings, like reference numerals designate corresponding parts throughout several views.

DETAILED DESCRIPTION

Figure 1:
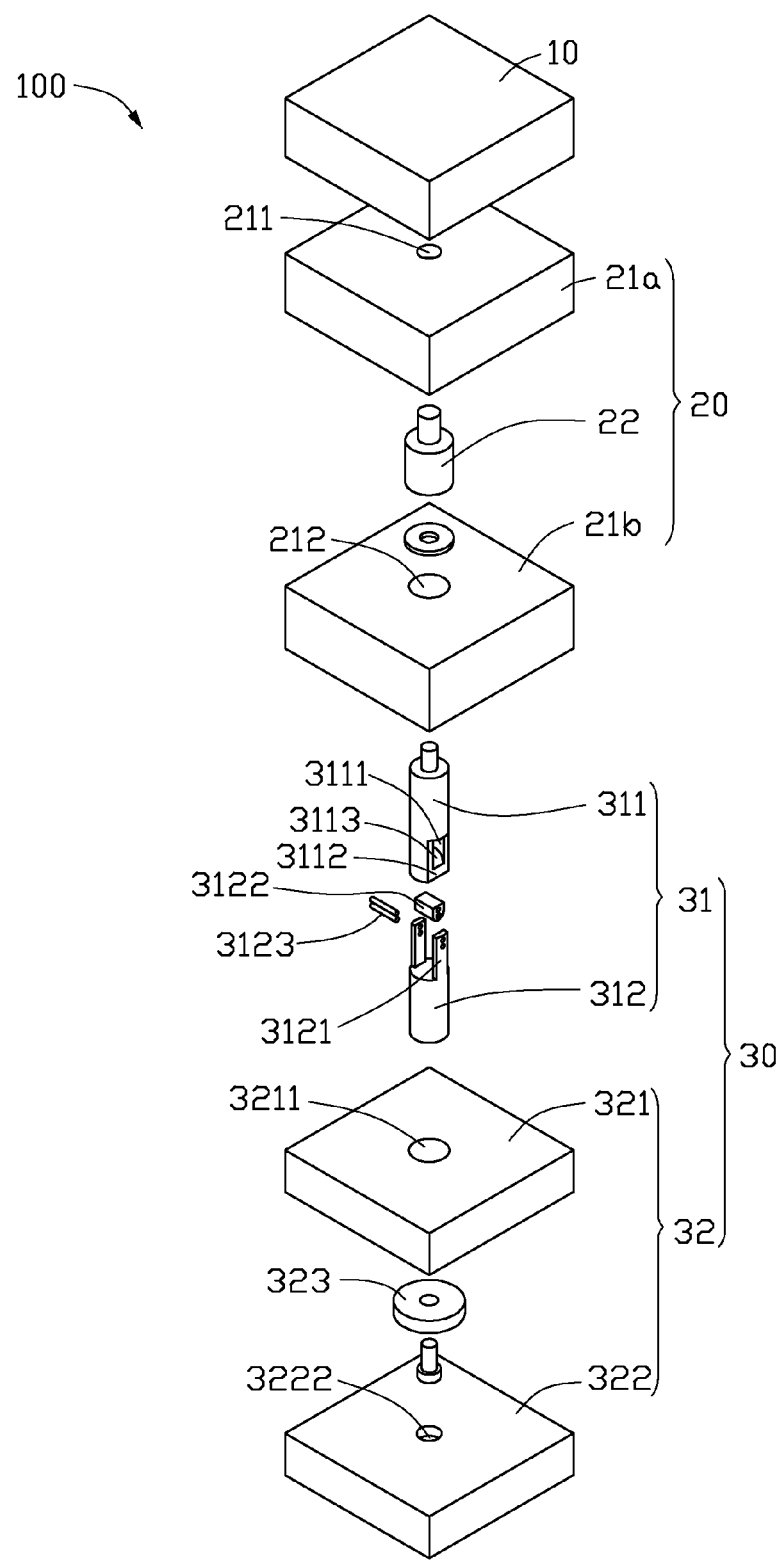
FIG. 1 is an isometric and exploded view of an injection mold, according to an exemplary embodiment of the present disclosure.
Figure 2:
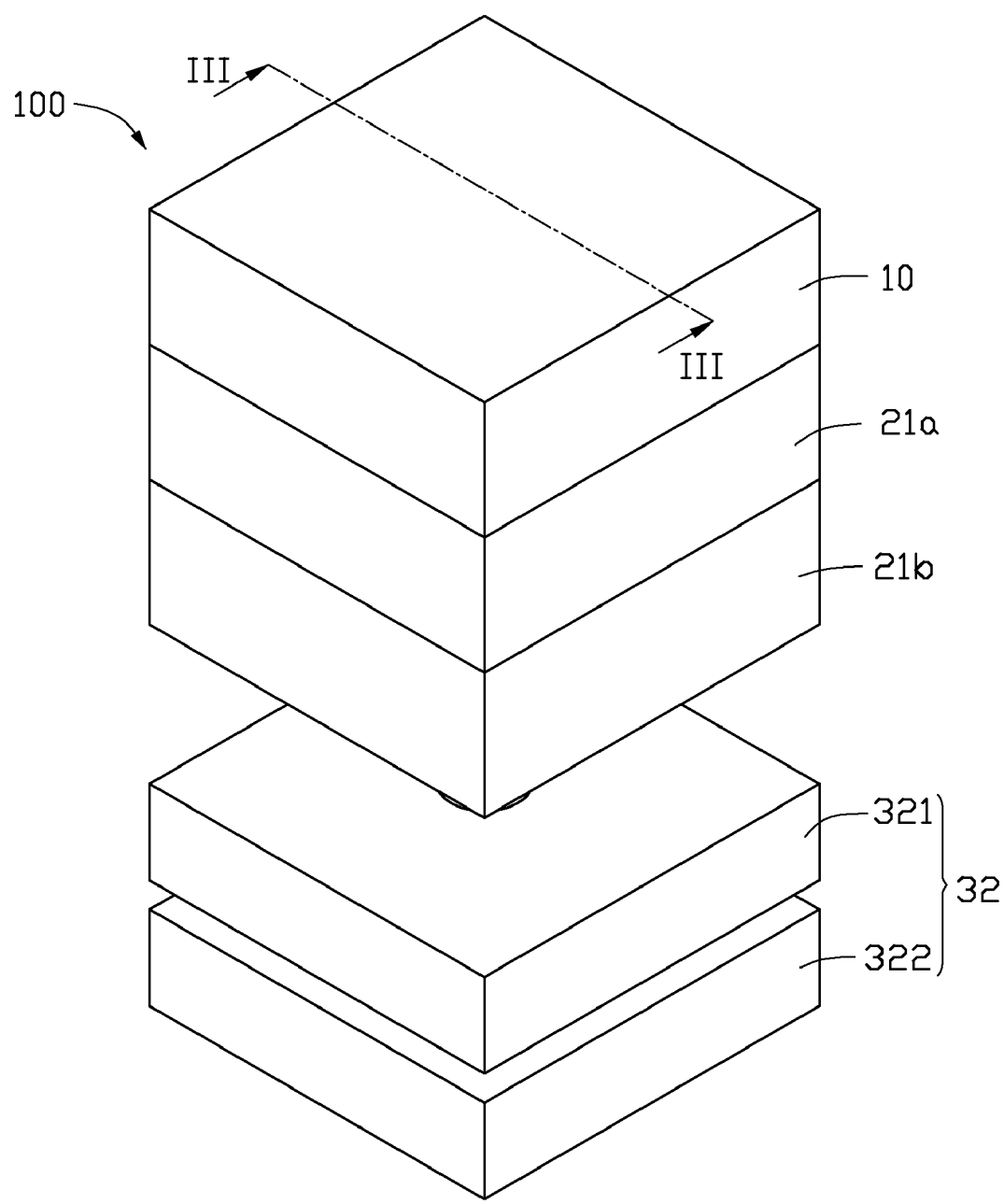
FIG. 2 is an assembled view of the injection mold of FIG. 1.

Referring to FIGS. 1-2, an injection mold 100, according to an exemplary embodiment, is shown. The injection mold 100 includes a female die 10, a male die 20, and an ejection device 30 slidably connected to the male die 20.

Figure 3:
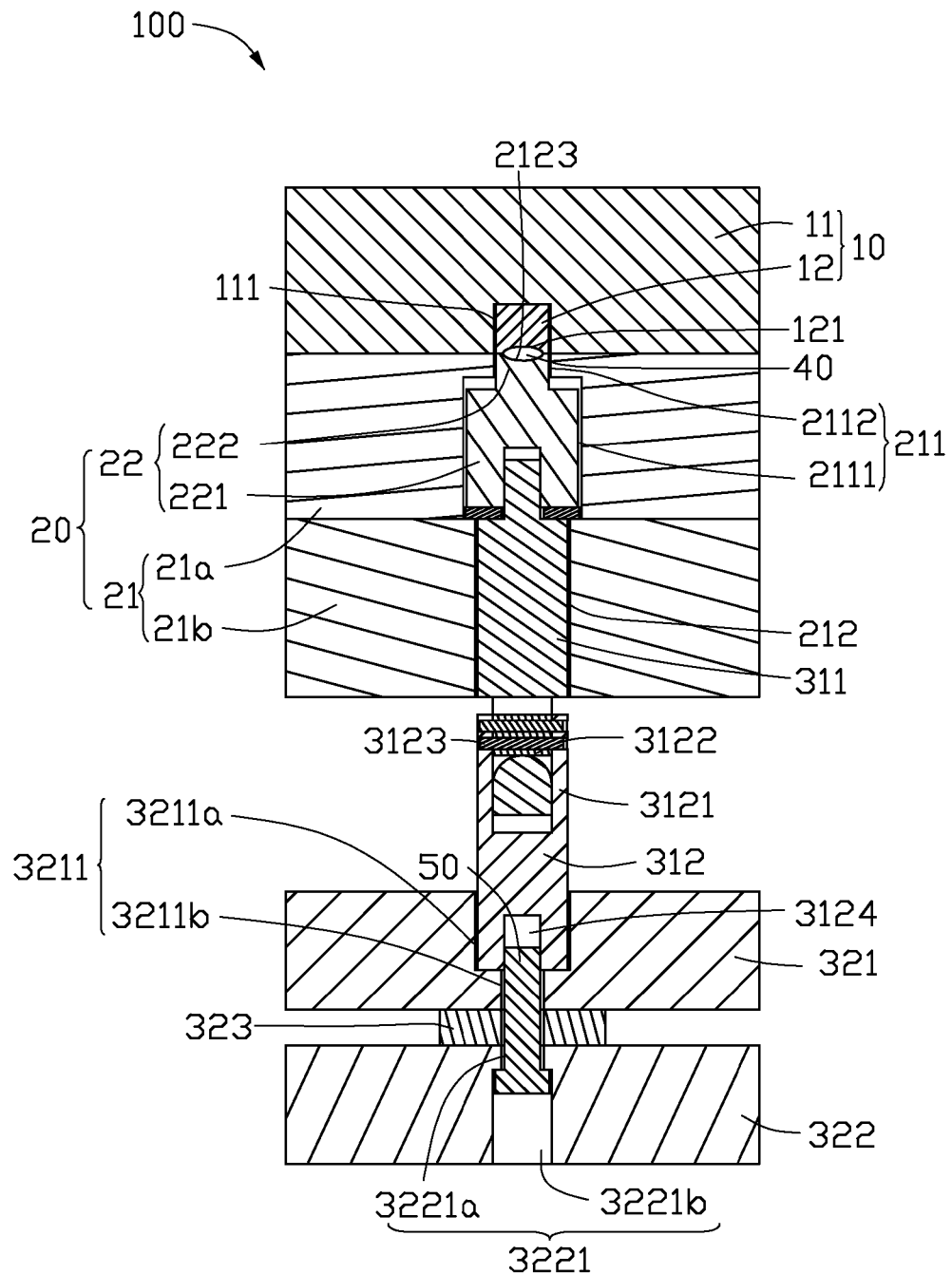
FIG. 3 is a sectional view along line III-III of the injection mold of FIG. 2.

Referring to FIGS. 1-3, the female die 10 includes female die body 11 and a female die core 12. The female die body 11 defines a female die cavity 111, and the female die core 12 is received in the female die cavity 111. The female die core 12 includes a first molding surface 121. The first molding surface 121 is an ultra-precision processed surface.

The male die 20 includes a male die body 21 and a male die core 22. The male die body 21 includes a first plate 21a and a second plate 21b connected to the first plate 21a. The first plate 21a defines a male die cavity 211. The male die cavity 211 is comprised of a first receiving portion 2111 and a second receiving portion 2112 communicating with the first receiving portion 2111. The diameter of the first receiving portion 2111 is greater than that of the second receiving portion 2112. The male die core 22 includes an embedded portion 221 and a molding portion 222 connected to the embedded portion 221. The diameter of the embedded portion 221 is greater than that of the second receiving portion 2112. The length of the central axis of the embedded portion 221 is less than that of the first receiving portion 2111. A second molding surface 223 is formed on the end of the molding portion 222. The second molding surface 2123 is an ultra-precision processed surface. The second plate 21b defines a first through hole 212 spatially corresponding to the male die cavity 211. The diameter of the first through hole 212 is less than that of the embedded portion 221 of the male die core 22.

The ejection device 30 includes an ejection-rod member 31 and an ejection-plate member 32 connected to the ejection-rod member 31. The ejection-rod member 31 includes a first ejection rod 311 and a second ejection rod 312. Two opposite flat surfaces 3112 are formed on a second distal end of the first ejection rod 311 adjacent to the second ejection rod 312. The first ejection rod 311 defines a slot 3111. The slot 3111 extends substantially perpendicular to the lengthwise direction of the first ejection rod 311 and passes through the two flat surfaces 3112 correspondingly. An inner curved surface 3113 is formed in the slot 3111 adjacent to the second ejection rod 312. The second ejection rod 312 includes two side plates 3121 and a pull block 3122. The two side plates 3121 are formed on one end of the second ejection rod 312 corresponding to the two flat surfaces 3112 of the first ejection rod 311. The pull block 3122 is arranged between the two side plates 3121. The other end of the second ejection rod 312 away from the first ejection rod 311 defines a threaded hole 3124.

The ejection-plate member 32 includes a first ejection plate 321 and a second ejection plate 322. The first ejection plate 321 defines a second through hole 3211 passing through the upper and lower surfaces of the first ejection plate 321. The second through hole 3211 is comprised of a first upper portion 3211a defined in the upper surface of first ejection plate 321 and a first lower portion 3211b defined in the lower surface of the first ejection plate 321. The first upper portion 3211a and the first lower portion 3211b communicate with each other. The diameter of the first upper portion 3211a is greater than that of the first lower portion 3211b. The second ejection plate 322 defines a third through hole 3221 passing through the upper and lower surfaces of the second ejection plate 322. The third through hole 3211 is comprised of a second upper portion 3221a defined in the upper surface of second ejection plate 322 and a second lower portion 3221b defined in the lower surface of the second ejection plate 322. The second upper portion 3221a and the second lower portion 3221b communicate with each other. The diameter of the second upper portion 3221a is less than that of the second lower portion 3221b. The ejection plate 32 further includes a ring shaped pad 323 positioned between the first ejection plate 321 and the second ejection plate 322.

In assembly, the embedded portion 221 is received in the first receiving portion 2111, and the molding portion 222 is received in the second receiving portion 2112. The first end of the first ejection rod 311 with the flat surfaces 3112 is connected to the end of the second ejection rod 312 with the side plates 3121. The first ejection rod 311 is inserted between the side plates 3121. The pull block 3122 passes through the slot 3111 with opposite ends correspondingly contacted with the two side plates 3121. The pull block 3122 is fixed to the two side plates 3121 by two first bolts 3123. The other end of the first ejection rod 311 away from the second ejection rod 312 passes through the first through hole 212 and the first receiving portion 2111 and is fixed on the male die core 22. The other end of the second ejection rod 321 away from the first ejection rod 311 is inserted into the first upper portion 3211a of the second through hole 3211 and is fixed in the second through hole 3211 by a second bolt 50. The second bolt 50 is passed through the third through hole 3222, the pad 323 and the first through hole 3212 and is threadedly engaged in the threaded hole 3124 of the second ejection rod 312.

In use, the female die 10 is connected to the male die 20 with the female die core 11 facing the male die core 22. The first molding surface 121 and the second molding surface 223 cooperatively define a molding cavity 40 for molding a workpiece. The male die core 22 is positioned in an original position in the male die cavity 211, and then the ejection plate 32 is fixed relative to the male die 20. When using the mold 100 to mold the product, an injection pressure is required to maintain the quality of the workpiece. As a result, the male die core 22 may deviate a short distance from its original orientation and/or position under the injection pressure. Because the first ejection rod 311 is slidably connected to the second ejection rod 312, the male die core 22 does not tilt relative to the male die cavity 212, thus the quality of the molded product is enhanced.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An injection mold, comprising:
    a female die comprising a female die body and a female die core received therein;
    a male die comprising a male die body and a male die core slidably received therein, the female die core and the male die core configured for cooperatively defining a molding cavity for forming a product; and
    an ejection device slidably passing through the male die for ejecting the product out of the mold cavity;
    wherein the ejection device comprises a first ejection rod and a second ejection rod slidably connected to the first ejection rod, a first distal end of the first ejection rod is connected to the male die core, the first ejection rod comprises opposite flat surfaces formed on a second distal end thereof adjacent to the second ejection rod, the first ejection rod defines a slot extending substantially perpendicular to a lengthwise direction of the first ejection rod and passing through the two flat surfaces, the second ejection rod comprises two side plates and a pull block, the two side plates are formed on one end of the second ejection rod corresponding to the two flat surfaces of the first ejection rod, the pull block is arranged between the two side plates, the first ejection rod is inserted between the side plates, the pull block passes through the slot with opposite ends correspondingly fixed to the two side plates, an end of the second ejection rod distal from the first ejection rod is configured to be fixed relative to the male die when forming the product.

2. The injection mold of claim 1, wherein the female die core comprises a first molding surface opposing the male die core, and the male die core comprises a second molding surface, the molding spacing is defined between the first molding surface and the second molding surface.

3. The injection mold of claim 1, wherein the female die defines a female die cavity, the female die core received in the female die cavity.

4. The injection mold of claim 1, wherein the male die body comprises a first plate and a second plate connected to the first plate.

5. The injection mold of claim 4, wherein the first plate defines a male die cavity, and the male die core is received in the die cavity.

6. The injection mold of claim 5, wherein the male die core comprises an embedded portion and a molding portion connected to the embedded portion, and the male die cavity comprises a first receiving portion and a second receiving portion communicating with the first receiving portion, the embedded portion is received in the first receiving portion, the molding portion is received in the second receiving portion.

7. The injection mold of claim 6, wherein the diameter of the first receiving portion is greater than that of the second receiving portion, the diameter of the embedded portion is greater than that of the second receiving portion, and the length of the central axis of the embedded portion is less than that of the first receiving portion.

8. The injection mold of claim 4, wherein the second plate defines a first through hole spatially corresponding to the die cavity, the diameter of the first through hole is less than that of the embedded portion of the male die core, and the first distal end of the first ejection rod passes through the first through hole and is connected to the male die core.

9. The injection mold of claim 1, wherein the ejection device comprises an ejection-rod member and an ejection-plate member connected to the ejection-rod member, the ejection-rod member comprises the first ejection rod and the second ejection rod.

10. The injection mold of claim 1, wherein the first ejection rod comprises an inner curved surface in the slot adjacent to the second ejection rod.

11. The injection mold of claim 1, wherein the second ejection rod comprises two first bolts for fixing the pull block between the two side plates.

12. The injection mold of claim 1, wherein the ejection-plate member includes a first ejection plate and a second ejection plate.

13. The injection mold of claim 12 wherein the first ejection plate defines a second through hole passing through the upper and lower surface of the first ejection plate, the second through hole comprises a first upper portion defined in the upper surface of first ejection plate and a first lower portion defined in the lower surface of the first ejection plate, and the first upper portion and the first lower portion communicate with each other, the diameter of the first upper portion is greater than that of the first lower portion.

14. The injection mold of claim 13 wherein and the second ejection plate defines a third through hole passing through the upper and lower surface of the second ejection plate, the third through hole comprises a second upper portion defined in the upper surface of second ejection plate and a second lower portion defined in the lower surface of the second ejection plate, the second upper portion and the second lower portion communicate with each other, the diameter of the second upper portion is less than that of the first lower portion.

15. The injection mold of claim 14 wherein the distal end of the second ejection rod defines a threaded hole therein, the mold comprises a second bolt passed through the third through hole and the first through hole and is threadedly engaged in the threaded hole of the second ejection rod.

16. The injection mold of claim 12 wherein the ejection-plate comprises a ring shaped pad positioned between the first ejection plate and the second ejection plate.

* * * * *